(12) United States Patent
Karpik et al.

(10) Patent No.: US 11,920,672 B2
(45) Date of Patent: Mar. 5, 2024

(54) LUBRICATION SYSTEM FOR COMPONENTS IN AN ENGINE STARTER

(71) Applicants: Unison Industries, LLC, Jacksonville, FL (US); GENERAL ELECTRIC COMPANY, Schenectady, NY (US)

(72) Inventors: Roberto Karpik, Warsaw (PL); Eliel Fresco Rodriguez, Springboro, OH (US); David Allan Dranschak, Union, OH (US); Shiloh Montegomery Meyers, Miamisburg, OH (US); Marcin Bialas, Warsaw (PL)

(73) Assignees: Unison Industries, LLC, Jacksonville, FL (US); General Electric Company, Schenectady, NY (US)

( * ) Notice: Subject to any disclaimer, the term of this patent is extended or adjusted under 35 U.S.C. 154(b) by 61 days.

(21) Appl. No.: 17/232,699

(22) Filed: Apr. 16, 2021

(65) Prior Publication Data

US 2021/0324952 A1    Oct. 21, 2021

(30) Foreign Application Priority Data

Apr. 20, 2020    (PL) .......................................... 433601

(51) Int. Cl.
| | | |
|---|---|---|
| F16H 57/04 | (2010.01) | |
| F01D 25/18 | (2006.01) | |
| F02C 7/06 | (2006.01) | |
| F02C 7/27 | (2006.01) | |
| F02C 7/277 | (2006.01) | |

(52) U.S. Cl.
CPC .......... *F16H 57/0471* (2013.01); *F01D 25/18* (2013.01); *F02C 7/06* (2013.01); *F02C 7/27* (2013.01); *F02C 7/277* (2013.01); *F16H 57/0423* (2013.01); *F05D 2220/30* (2013.01); *F05D 2240/50* (2013.01); *F05D 2260/98* (2013.01)

(58) Field of Classification Search
CPC ............... F16H 57/0471; F16H 57/042; F16H 57/0423; F01D 25/16; F01D 25/18; F01D 25/20; F01D 25/34; F02C 7/06; F02C 7/27; F02C 7/275; F02C 7/277; F02C 7/32; F05D 2220/30; F05D 2240/50; F05D 2260/98
See application file for complete search history.

(56) References Cited

U.S. PATENT DOCUMENTS

| | | | | |
|---|---|---|---|---|
| 2,005,464 | A | * 6/1935 | Hermann | ............ F16C 33/6659 |
| | | | | 384/609 |
| 2,615,533 | A | * 10/1952 | Cliborn | ................... F01D 15/12 |
| | | | | 277/390 |
| 2,791,090 | A | 5/1957 | Stanley | |

(Continued)

*Primary Examiner* — Loren C Edwards
(74) *Attorney, Agent, or Firm* — McGarry Bair PC

(57) ABSTRACT

An air turbine starter that includes a housing with a divider structure dividing the housing into a wet chamber and an air chamber. The air turbine starter further including a bearing assembly, a turbine member, a first drive shaft, and a second drive shaft connecting the turbine member with a rotating assembly. A lubricant supply portion having at least one supply inlet fluidly coupled to the wet chamber and at least one supply outlet fluidly coupled to the bearing assembly whereby lubricant from the wet chamber can be supplied to the bearing assembly.

19 Claims, 5 Drawing Sheets

(56) References Cited

U.S. PATENT DOCUMENTS

| | | | |
|---|---|---|---|
| 2,878,894 A * | 3/1959 | Andrews | F16N 7/32 |
| | | | 384/466 |
| 5,042,963 A * | 8/1991 | Sorenson | F02C 7/268 |
| | | | 415/18 |
| 7,699,530 B2 | 4/2010 | Blais | |
| 8,308,426 B2 | 11/2012 | Cigal et al. | |
| 9,028,576 B2 | 5/2015 | Slayter et al. | |
| 9,121,491 B2 | 9/2015 | Hancox | |
| 10,018,087 B2 | 7/2018 | Prunera-Usach et al. | |
| 10,234,018 B2 | 3/2019 | Hasting et al. | |
| 10,301,985 B2 | 5/2019 | Choi | |
| 2006/0056958 A1 | 3/2006 | Gaines et al. | |
| 2011/0203249 A1* | 8/2011 | Telakowski | F01D 25/18 |
| | | | 60/39.83 |
| 2015/0292414 A1 | 10/2015 | Geck et al. | |
| 2017/0198641 A1 | 7/2017 | Slayter et al. | |
| 2018/0195437 A1 | 7/2018 | Stephan et al. | |
| 2019/0218936 A1 | 7/2019 | Fomison et al. | |

\* cited by examiner

LUBRICATION SYSTEM FOR COMPONENTS IN AN ENGINE STARTER

CROSS REFERENCE TO RELATED APPLICATIONS

This application claims priority to Polish Patent Application P433601, filed Apr. 20, 2020, which is incorporated herein by reference in its entirety.

TECHNICAL FIELD

The disclosure generally relates to a lubrication system for an air turbine starter, and, more specifically to a lubricant supply portion of a bearing in the air turbine starter.

BACKGROUND

A turbine engine, for example a gas turbine engine, is engaged in regular operation to an air turbine starter. Air turbine starters are typically mounted to the engine through a gearbox or other transmission assembly. The transmission transfers power from the starter to the engine to assist in starting the engine. When the air turbine starter is engaged with the turbine engine through the transmission, pressurized air supplied to the air turbine starter can be used to rotate the turbine engine to a starting rotational speed.

BRIEF DESCRIPTION

In one aspect, the present disclosure generally relates to an air turbine starter comprising a housing having a divider structure dividing the housing into a wet chamber and an air chamber, with the air chamber having an air supply inlet and an air supply outlet, a bearing assembly, a turbine member located within the air chamber and a first drive shaft coupled to the turbine member and rotatably mounted in the bearing assembly, with the first drive shaft forming a first rotational axis, a rotating assembly located within the wet chamber and an second drive shaft coupled to the rotating assembly, with the second drive shaft forming a second rotational axis, and a lubricant supply portion having at least one supply inlet fluidly coupled to the wet chamber and at least one supply outlet fluidly coupled to the rotating assembly whereby lubricant from the wet chamber can be supplied to the bearing assembly through the lubricant supply portion.

In another aspect, the present disclosure generally relates to a method of lubricating a bearing in an air turbine starter having a housing defining an air chamber and a wet chamber, with a turbine member located in the air chamber, a bearing assembly located within the wet chamber, and a rotating assembly located in the wet chamber, which contains a lubricant, the method comprising rotating the rotating assembly to apply a force to the at least some of the lubricant and using the applied force to supply the lubricant to the bearing assembly.

DETAILED DESCRIPTION

Figure 1:
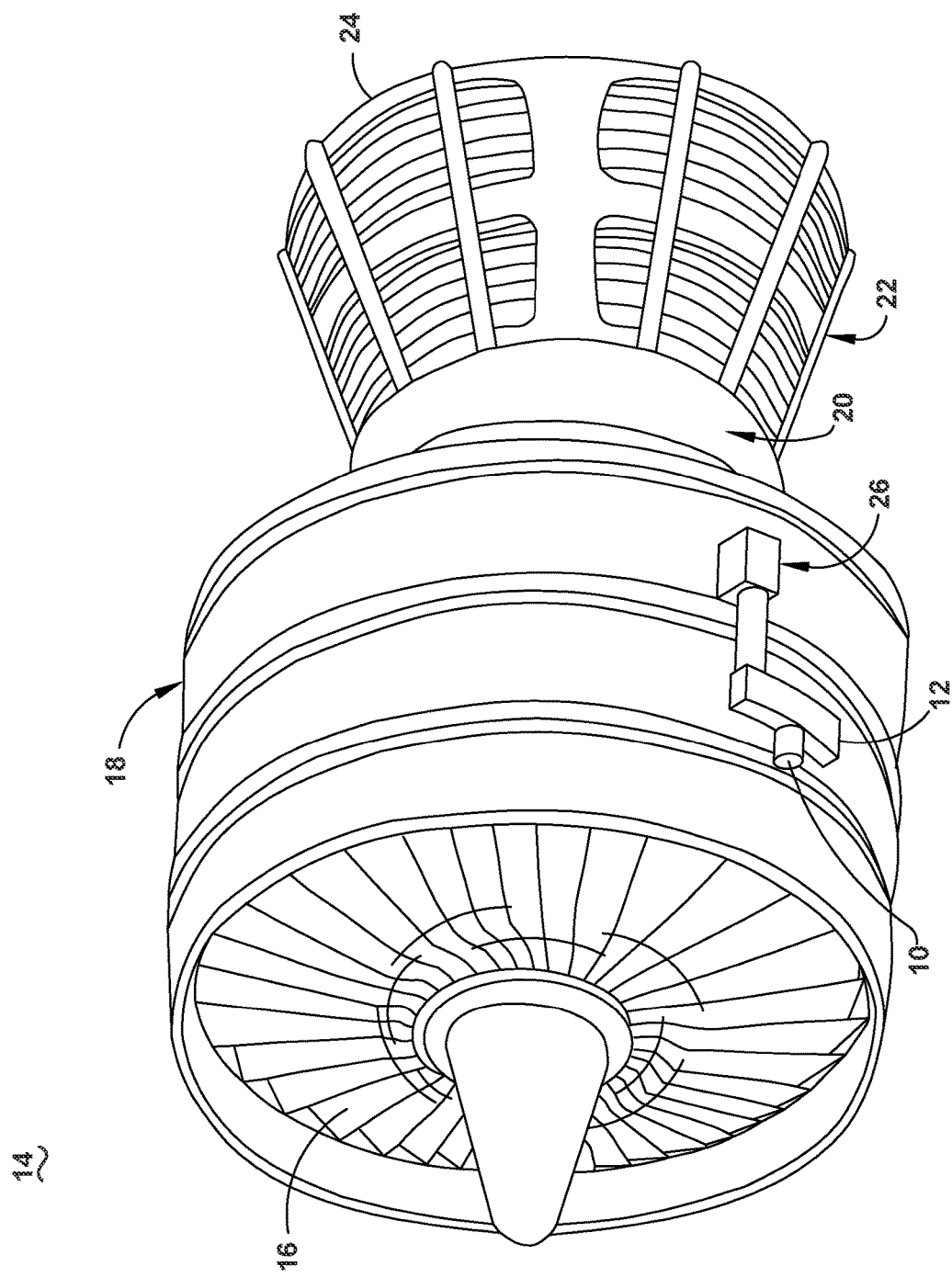
FIG. 1 is a schematic illustration of a turbine engine with an air turbine starter in accordance with various aspects described herein.

Aspects of the disclosure described herein are directed to a turbine engine with a starter that includes a lubrication system which includes a lubricant supply portion for a bearing assembly in communication with a first drive shaft. The lubricant supply portion can supply lubrication to the bearing assembly via a channel portion which receives lubrication that is forced into a supply inlet portion by a gear assembly. For purposes of illustration, the present disclosure will be described with respect to a starter for an aircraft turbine engine. For example, the disclosure can have applicability in other vehicles or engines, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a starter motor or air turbine starter 10 is coupled to an accessory gearbox (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high-pressure compression region 18. The air intake with a fan 16 and the high-pressure compression region collectively are known as the 'cold section' of the turbine engine 14 upstream of the combustion. The high-pressure compression region 18 provides a combustion chamber 20 with high-pressure air. In the combustion chamber, the high-pressure air is mixed with fuel and combusted. The hot and pressurized combusted gas passes through a high-pressure turbine region 22 and a low-pressure turbine region 24 before exhausting from the turbine engine 14. As the pressurized gases pass through the high-pressure turbine (not shown) of the high-pressure turbine region 22 and the low-pressure turbine (not shown) of the low-pressure turbine region 24, the turbines extract rotational energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of a shaft to power the fan 16.

The AGB 12 is coupled to the turbine engine 14 at either the high-pressure or low-pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high-pressure compression region 18.

Figure 2:
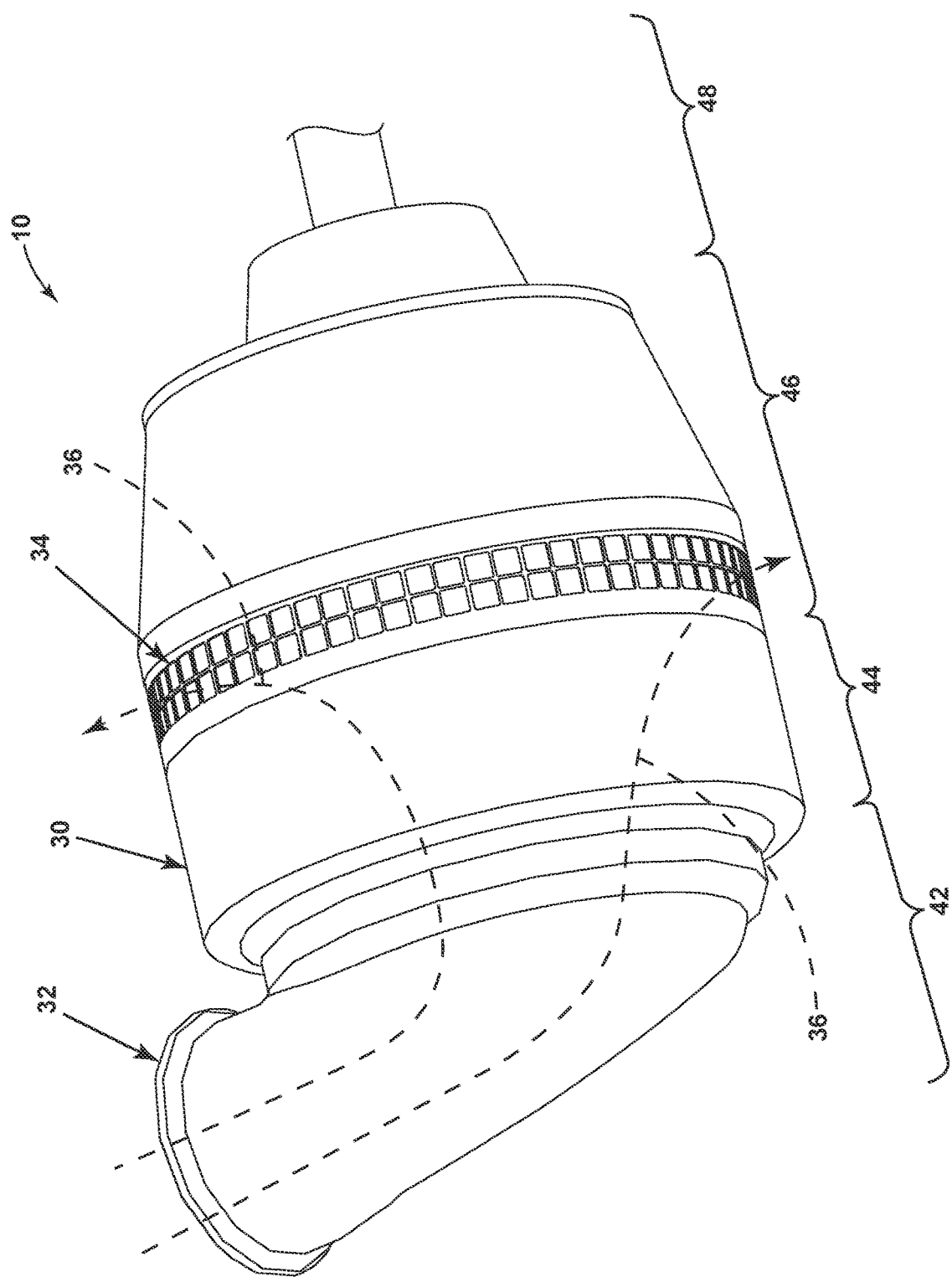
FIG. 2 is a perspective view of the air turbine starter of FIG. 1.

Referring now to FIG. 2, a perspective view of exemplary air turbine starter 10 is shown in greater detail. Generally, the air turbine starter 10 includes a housing 30 defining an air supply inlet 32 and an air supply outlet 34. A primary air flow path 36, illustrated schematically with arrows, extends between the air supply inlet 32 and the air supply outlet 34 for communicating a flow of fluid, including, but not limited to gas, compressed air, or the like, there through. In one non-limiting example, the fluid is air, such as pressurized air, that is supplied from a pressurized air source, including but not limited to, a ground-operating air cart, an auxiliary power unit, or a cross-bleed start from an engine already operating.

The housing 30 can be formed in any suitable manner including, but not limited to, that it can be made up of two or more parts that are joined or otherwise coupled together or can be integrally formed as a single piece.

In the depicted aspects of the disclosure, the housing 30 of the air turbine starter 10 generally defines, in an in-line series arrangement, an inlet assembly 42, a turbine rotor assembly 44, a gearbox 46, and a drive section 48. The air turbine starter 10 can be manufactured with any suitable materials and methods, including, but not limited to, additive manufacturing or die-casting of high strength and lightweight metals such as aluminum, stainless steel, iron, or titanium. The housing 30 and the gearbox 46 can be formed with a thickness sufficient to provide adequate mechanical rigidity without adding unnecessary weight to the air turbine starter 10 and, therefore, the aircraft.

Figure 3:
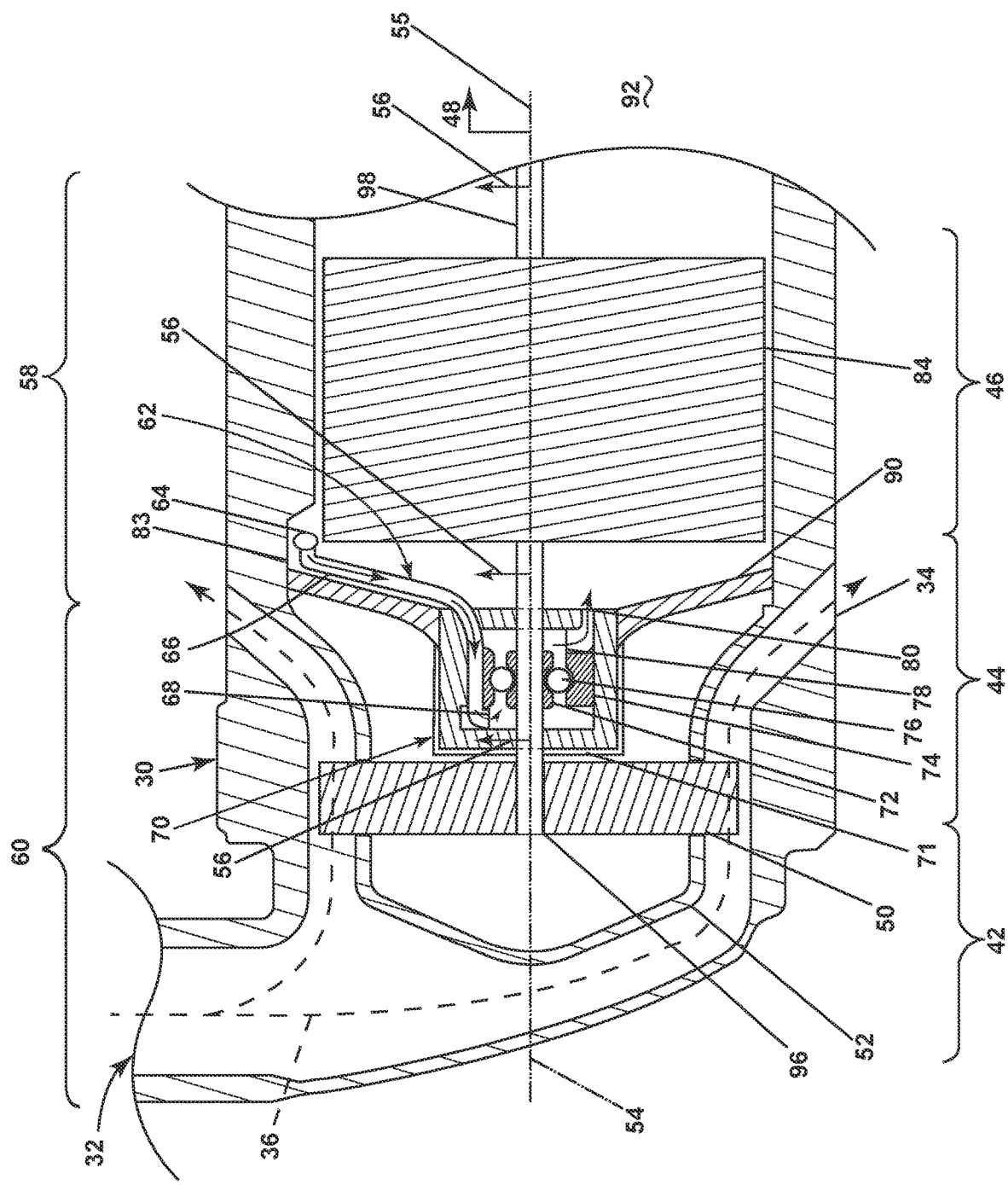
FIG. 3 is a schematic cross-sectional view of a portion of the starter of FIG. 2.

FIG. 3 is a schematic cross section of the housing 30 of the air turbine starter 10 of FIG. 2 defining an interior which can include a divider structure 90. The divider structure 90 can be formed as a continuous wall in which fluid cannot pass through. Alternatively, the divider structure 90 can be formed as multiple segmented parts connected together so as to form a fluid-tight seal.

The divider structure 90 can separate the interior so as to define at least a wet chamber 58 and an air chamber 60. The wet chamber 58 can be defined as a section of the air turbine starter 10 in which a lubricant is present for the gearbox 46. The wet chamber 58 can include components of the air turbine starter 10 which are downstream the divider structure 90 toward a rear side 92. The air chamber 60 can be defined as a section of the air turbine starter 10 in which the pressurized air flows through the turbine rotor assembly 44. The air chamber 60 can include components of the air turbine starter 10 which are upstream the divider structure 90 toward a forward side 94.

The inlet assembly 42 can be provided within and/or fluidly coupled to the air chamber 60. The inlet assembly 42 can include a stationary portion 52 to guide the air flow in the primary air flow path 36. By way of non-limiting example, the stationary portion 52 can define at least a portion of the primary air flow path 36 from the air supply inlet 32 to the turbine member 50. The stationary portion 52 can be coupled to the housing 30.

A turbine member 50 can be provided in the air chamber 60 of the air turbine starter. The turbine member 50 can be disposed in the primary air flow path 36 for rotatably extracting mechanical power from the flow of gas from the air supply inlet 32 to the air supply outlet 34.

A first drive shaft 96 rotationally couples the turbine member 50 to the gearbox 46 and defines a first rotational axis 54. The first drive shaft 96 permits the transfer of energy from the rotating turbine member 50 to the gearbox 46, thereby converting the energy from air in the primary air flow path 36 to rotational mechanical power. The first drive shaft 96 can extend through at least a portion of the inlet assembly 42, the turbine rotor assembly 44, and the gearbox 46.

The gearbox 46 can be provided within the wet chamber 58. The gearbox 46 can include a gear assembly 84. The gear assembly 84 can be defined as a gear system which takes an input rotational velocity from the first drive shaft 96 driven by the turbine member 50, and outputs a rotational velocity through a second drive shaft 98 via a gear train that can include, by way of non-limiting example, a series of enmeshed gears, such as a planetary gear system. The output rotational velocity of the output shaft or second drive shaft 98 could be equal to, greater than, or less than the input rotational velocity of the first drive shaft 96. The second drive shaft 98 can extend through the housing 30 and define a second rotational axis 55. As illustrated, the second rotational axis 55 is the same as the first rotational axis 54. Alternatively, the first and second rotational axis's 54, 55 can be different. The second drive shaft 98 can be connected to any suitable components in the drive section 48 such as, but not limited to, a generator, a clutch assembly, an external gearbox or ring gear, pumps, or the like. The gear assembly 84 is contemplated to be a planetary gear system, but other gear systems are possible and can include any suitable gear such as, but not limited to, planetary gears, internal gears, worm gears, miter gears, screw gears, bevel gears, gear racks, helical gears, spur gears, or the like. Additionally, the gear assembly 84 can include any other suitable components such as, but not limited to, bearings, rollers, gear carriers, or the like. The gear assembly 84, or the housing 30 circumscribing or adjacent to the gear assembly 84 can further include any number of seals, barriers, walls, casings, protrusions, deflectors, or inhibitors to the movement of the lubricant.

At least one bearing assembly 70 can be configured to journal the first drive shaft 96 to the divider structure 90.

While illustrated for purposes of convenience as having a single bearing 76, the at least one bearing assembly 70 can include any number of bearings 76, including a single ball bearing or multiple ball bearings. The bearing 76 can be any suitable bearing such as, but not limited to, self-aligning bearings, angular-contact bearings, thrust ball bearings, rolling bearings, tapered roller bearings, or the like.

The bearing assembly 70 can include various internal components such as, an inner raceway 72, an outer raceway 74, and the bearings 76. Nestled between the inner and outer raceways 72, 74 can be the bearings 76. The bearing assembly 70 can also include an outer wall 71. The outer wall 71 can be a portion of the bearing assembly 70 which is directly exposed to the air chamber 60. As illustrated, the outer wall 71 is contacted by the air chamber 60 at its radially distal ends with respect to the first rotational axis 54, and axially upstream end.

A lubricant supply portion 62 can extend from, and through at least a portion of the bearing assembly 70. The lubricant supply portion 62 can include a supply inlet 64 which can be fluidly coupled to the wet chamber 58, a channel portion 66 which can extend through at least a portion of the wet chamber 58 and into the bearing assembly 70, and a supply outlet 68 which can be located within the bearing assembly 70.

The supply inlet 64 can be located in a radial outer half, up to a radial limit, of the wet chamber 58. The radial limit 83 of the wet chamber 58 can be a portion of the wet chamber 58 which is radially farthest from the first rotational axis 54. The radial outer half of the wet chamber 58 can be defined as the portion of the wet chamber 58 radially outward from the halfway distance between the first rotational axis 54, and the housing 30 at any portion of the wet chamber 58. The supply inlet 64 and the radial limit 83 can be located upstream, downstream, or within the gear assembly 84. The supply inlet 64, can be located in a gravitational upper half 56 of the wet chamber 58. The gravitational upper half 56 is illustrated as a region in the direction of and between the arrows and the housing 30. The gravitational upper half 56 of the wet chamber 58 can be defined as a portion of the wet chamber 58 which is opposite an instantaneous gravitational force exerted on the turbine air starter 10 when the air turbine starter 10 is installed on the turbine engine 14. Any fluid in the gravitational upper half 56 will naturally flow by gravity in the opposite direction of the arrows indicating the gravitational upper half 56. That is, fluid in the gravitational upper half 56 will tend towards a gravitational lower half when the air turbine starter 10 is mounted to the turbine engine 14 and the turbine engine 14 is in a position from which it can start.

The channel portion 66 can be a tube extend through at least a portion of the wet chamber 58 and into the bearing assembly 70. That is, the channel portion 66 fluidly couples the supply inlet 64 to the supply outlet 68 of the lubricant supply portion 62. The channel portion 66 can be placed against or pass through at least a portion of the divider structure 90. Further, the channel portion 66 can run through or around at least a portion of the gear assembly 84. For example, the supply inlet 64 can be placed downstream the gear assembly 84. As such, the channel portion 66 can run through or around at least a portion of the gear assembly 84 to reach the supply outlet 68.

The lubricant supply portion 62 can be a stand-alone structure such that it can be molded or assembled as a separate piece and consequently placed in the wet chamber 58 during assembly of the air turbine starter 10. Alternatively, the lubricant supply portion 62 can be part of the air turbine starter 10, or formed by one or more parts of any one or more of the housing 30, the gear assembly 84, the bearing assembly 70, or the divider structure 90. That is, the channel portion 66 can be formed by a passage, gap, or void in a portion of the divider structure 90. The channel portion 66 can be formed as a passage, or gap within a portion of the divider structure 90 or the bearing assembly 70. Alternatively, the channel portion 66 can include a hose or conduit coupled to a passage, gap, or void in a portion of the divider structure 90. It is contemplated that the channel portion 66 fluidly coupling the supply inlet 64 to the supply outlet 68 can be comprised of any number of components.

The supply outlet 68 can be positioned within the bearing assembly 70, and be operable to supply the lubricant to the bearings 76. The supply outlet 68 can be positioned within a gravitational upper half 56 of the bearing assembly 70. The supply outlet 68 can be positioned in an axially forward location of the bearing assembly 70 of the air turbine starter 10. Alternatively, the supply outlet 68 can fluidly connect to the bearing 70 at any axial or radial position of the bearing assembly 70.

During operation of the air turbine starter 10, the air along the primary air flow path 36 enters the air turbine starter 10 through the air supply inlet 32, and exits via the air supply outlet 34. This movement of the air along the primary air flow path 36 can rotate the turbine member 50, which in turn can rotate the first drive shaft 96, providing the input rotational velocity to the gear assembly 84. The input rotational velocity can cause components of the gear assembly 84 to rotate. One or more of the components can apply a centrifugal force to at least a portion of the lubricant to follow the rotation of the gear assembly 84 and flow within the wet chamber 58. That is, at least a portion of the lubricant is expelled or projected in a radial direction away from the first rotational axis 54 when components of the gearbox 46 spin due to a combination of at least frictional and normal forces. Although illustrated as the lubricant is pressurized by the rotation of the gear assembly 84 such that it can enter the supply inlet 64, it will be appreciated that the lubricant can be pressurized by any rotating assembly. The rotating assembly can be defined as any portion of the air turbine starter 10 described herein which is configured to rotate within the wet chamber 58 and coupled to the second drive shaft 98.

The supply inlet 64 is positioned in the wet chamber 58 so that at least a portion of the lubricant that has experienced a force from the gearbox 46 enters the supply inlet 64. Inertia of the lubricant as it enters the supply inlet 64 can result in the lubricant flowing through the channel portion 66 out the supply outlet 68, and into the bearing assembly 70. Once some of the lubricant is in the bearing assembly 70, it can then flow around the bearing 76. One example is lubricant flowing from one axial end of the bearing assembly 70 to an opposite axial end of the bearing assembly 70. The flow of the lubricant through the bearing assembly 70 can be guided by the applied force form the gear assembly 84 or the rotation of the bearing assembly 70. Further, the lubricant can at least be partially affected by gravitational force such that the lubricant tends to flow from a gravitational upper half 56 of the bearing assembly 70 to a gravitational lower half (opposite the gravitational upper half) of the bearing assembly 70.

An inlet 78 to a bearing assembly outlet 80 can be provided in the gravitational lower half (opposite of gravitational upper half 56) of the bearing assembly 70, such that lubricant which has passed through the bearing assembly 70 can then flow through the inlet 78 and out the bearing assembly outlet 80. An outlet channel can be defined by the portion between the inlet 78 and the bearing assembly outlet 80. The bearing assembly outlet 80 can lead to various internal, or external components of the air turbine starter 10. For example, the lubricant can return to the wet chamber 58 via a bearing assembly outlet 80. Alternatively, the lubricant can be channeled to an exterior waste tub, to the gear assembly 84, back into the bearing assembly 70, or other sections of the air turbine starter 10. The inlet 78 can be placed at an axial, or radial end of the bearing assembly 70 opposite that of the supply outlet 68. The inlet 78 can be placed at a downstream end of the bearing assembly 70, while the supply outlet 68 can be placed at an upstream end.

Figure 4:
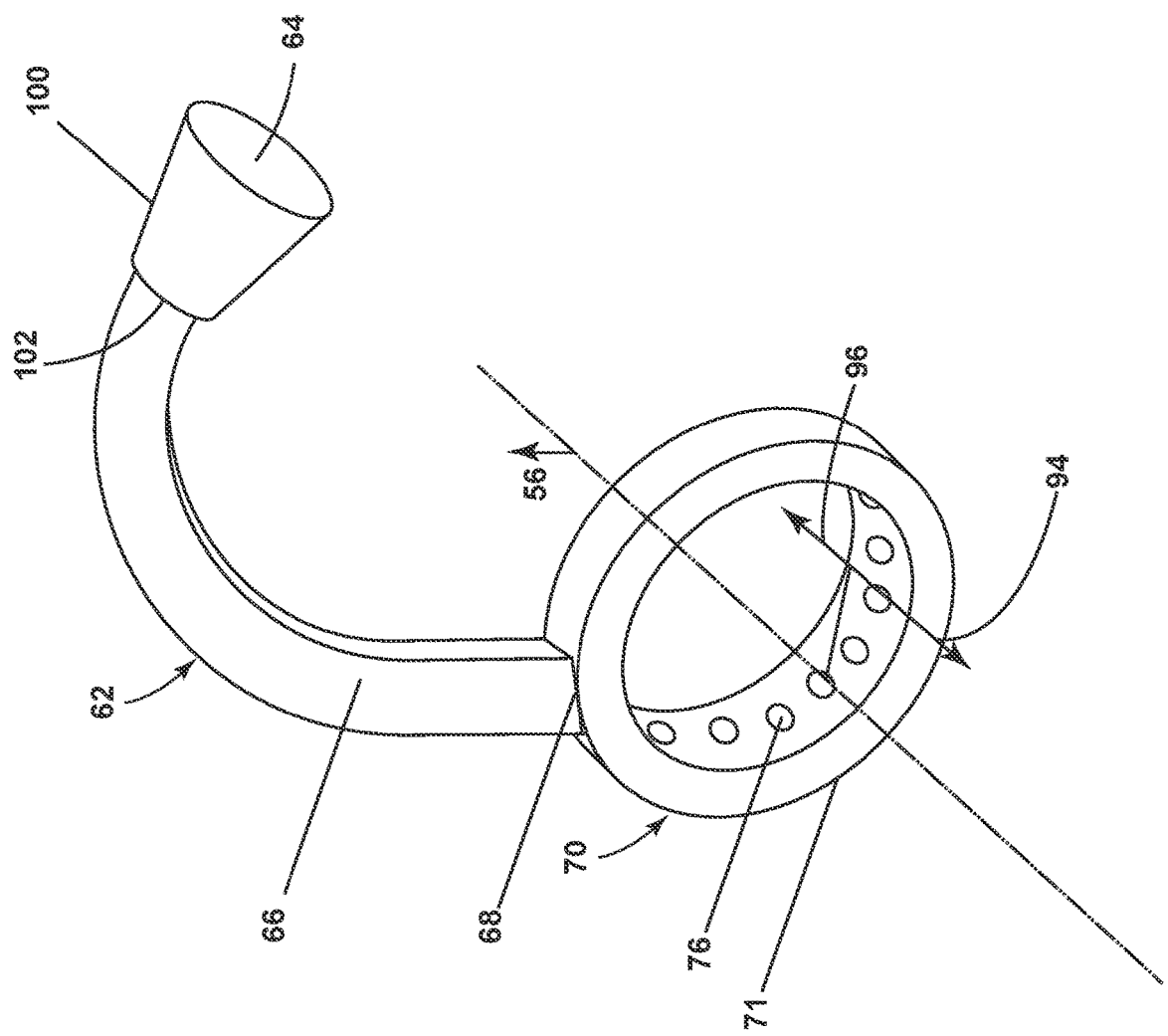
FIG. 4 is a perspective view of a lubricant supply portion with an inlet and an outlet connected to a bearing assembly of the starter of FIG. 3.

FIG. 4 illustrates the bearing assembly 70, and the lubricant supply portion 62 of FIG. 3. The lubricant supply portion 62 can include the supply inlet 64 with a supply inlet portion 100 leading to a throat 102 of the channel portion 66. The throat 102 of the channel portion 66 can be defined as the portion of the channel portion 66 fluidly couples the channel portion 66 to the supply inlet 64, and can provide an opening for the lubricant to flow from the supply inlet 64, through the supply inlet portion 100 and into the channel portion 66.

The supply inlet portion 100 can be an extension of the channel portion 66, or a separate piece coupled to the throat 102 of the supply inlet 64. The supply inlet 64 can have a first cross-sectional area, and the throat 102 can have a second cross-sectional different than the first cross-sectional area. In such as case, a cross-sectional area of the supply inlet portion 100 can decrease from the supply inlet 64 to the throat 102. This cross-sectional area of the supply inlet portion 100 can decrease continuously, or non-continuous such that the cross-sectional area decreases at a greater rate at a first location of the supply inlet portion 100 than a second location, different than the first, of the supply inlet portion 100. Alternatively, the cross-sectional area of the supply inlet portion 100 can increase at various locations continuously, or non-continuously. The cross-sectional areas of the throat 102, and the supply inlet 64 can further be the same such that the cross-sectional area of the supply inlet portion 100 does not increase, or decrease.

The cross-sectional area of the supply inlet portion 100 can be formed such that the supply inlet portion 100 defines a cone. Alternatively, the supply inlet portion 100 can define any suitable shape such as a prism, a bowl, a pyramid, or the like.

The channel portion 66 can include a rectangular cross section and be a constant cross-sectional area the entire way through. Alternatively, the channel portion 66 can be any suitable shape, and have a varying cross-sectional area at different locations along the channel portion 66.

The channel portion 66 can follow a curved contour as illustrated. Alternatively, the channel portion 66 can be formed to follow any suitable contour. It will be appreciated that the contour shown is for illustration purposes and should not be limited to such.

Figure 5:
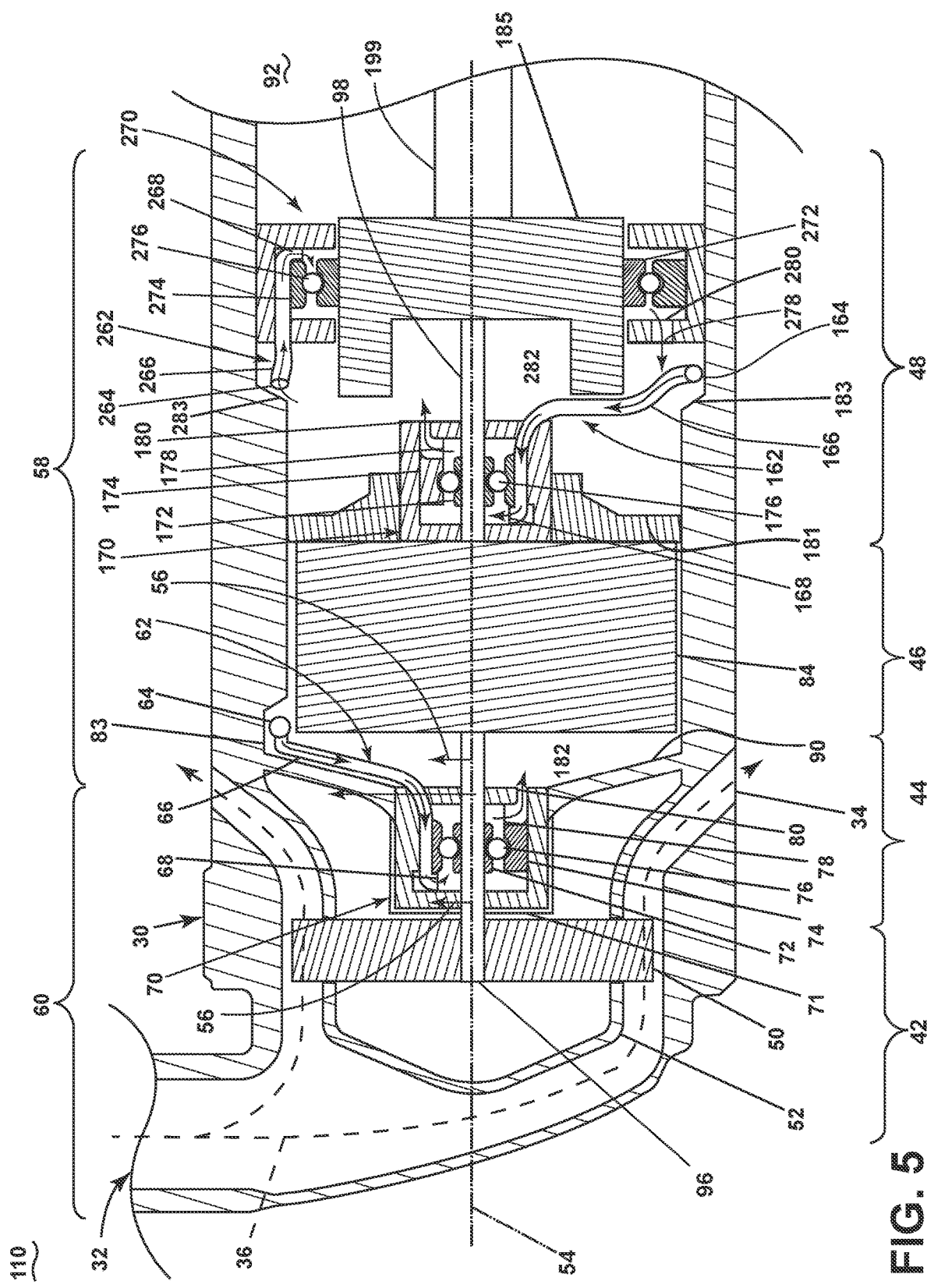
FIG. 5 is an extended schematic cross-sectional view of the starter of FIG. 3.

FIG. 5 is a schematic cross-sectional view of an air turbine starter 110. The air turbine starter 110 is similar to the air turbine starter 10 of FIG. 3, therefore, like parts will be identified with like numerals increased by increments of 100, with it being understood that the description of the like parts of the air turbine starter 10 applied to the air turbine starter 110 unless otherwise noted. The air turbine starter 110 includes the air chamber 60 and the wet chamber 58. The wet chamber 58 can include various rotating assemblies such as the gear assembly 84 and a clutch assembly 185 located at least partially in the drive section 48.

The air turbine starter 110 can include the housing 30 defining an interior which can include the divider structure 90. The divider structure 90 can separate the interior so as to define the wet chamber 58 and the air chamber 60. The wet chamber 58 can include components of the air turbine starter 110 which are downstream the divider structure 90 toward the rear side 92 of the air turbine starter 110. The air chamber 60 can be defined as a section of the air turbine starter 110 in which the pressurized air flows through the turbine rotor assembly 44. The air chamber 60 can include components of the air turbine starter 110 which are upstream the divider structure 90 toward the forward side 94.

The inlet assembly 42 can be provided within and/or fluidly coupled to the air chamber 60. The inlet assembly 42 can include the stationary portion 52 to guide the air flow in the primary air flow path 36 The stationary portion 52 can be coupled to the housing 30.

The turbine member 50 can be provided in the air chamber 60 of the air turbine starter 110. The turbine member 50 can be disposed in the primary air flow path 36 for rotatably extracting mechanical power from the flow of gas from the air supply inlet 32 to the air supply outlet 34.

The first drive shaft 96 rotationally couples the turbine member 50 to the gearbox 46 and defines the first rotational axis 54. The first drive shaft 96 can extend through at least a portion of the inlet assembly 42, the turbine rotor assembly 44, and the gearbox 46.

The gearbox 46 can be provided within the wet chamber 58. The gearbox 46 can include the gear assembly 84. The gear assembly 84 can be defined as a gear system which takes an input rotational velocity from the first drive shaft 96 driven by the turbine member 50, and outputs a rotational velocity through the second drive shaft 98 via a gear train. The second drive shaft 98 can extend through the housing 30 and define the second rotational axis 55 As illustrated, the second drive shaft 98 can be connected to the clutch assembly 185.

The second drive shaft 98 can extend from the gear assembly 84 to the clutch assembly 185. The second drive shaft 98 can be selectively coupled to the clutch assembly 185 such that the rotation of the gear assembly 84 can drive the rotation of the clutch assembly 185 during an initial starting operation of the air turbine starter 110. A third drive shaft 199 can be coupled to a downstream end of the clutch assembly 185. The third drive shaft 199 can be operable to provide an output work via an output rotation of the third drive shaft 199 to any downstream component or system (e.g., a generator, an external gearbox or ring gear, pumps, or the like).

The bearing assembly 70, otherwise defined as a first bearing assembly 70, a second bearing assembly 170, and a third bearing assembly 270 can be included in the air turbine starter 110. The first bearing assembly 70 can be configured to journal the first drive shaft 96 to the divider structure 90. The second bearing assembly 170 can be configured to journal the second drive shaft 98 to a support structure 181. The third bearing assembly 270 can be configured to journal the clutch assembly 185 to the housing 30.

The second bearing assembly 170 can be supported by the support structure 181. The support structure 181 can be defined as a structure coupled at one end to a housing 30 and at a second end to the second bearing assembly 170. The support structure 181 can allow lubricant to flow from upstream the gear assembly 84 to downstream the gear assembly 84. Alternatively, the support structure 181 can form a fluid tight seal similar to a divider structure 90. As such, the support structure 181 can form an upstream chamber 182 and a downstream chamber 282 within the wet chamber 58. Both the upstream and downstream chambers 182, 282 can contain separate volumes of the lubricant. The upstream chamber 182 can be defined as the chamber which contains the lubricant to lubricate the first bearing assembly 70 and the gear assembly 84. The downstream chamber 282 can be defined as the chamber which contains the lubricant to lubricate the second and third bearing assemblies 170, 270 and the clutch assembly 185.

While the first, second, and third bearing assemblies 70, 170, 270 are having a single bearing 76, 176, 276, respectively, it will be appreciated that the first, second, and third bearing assemblies 70, 170, 270 can include any number of bearings 76, 176, 276, including a single ball bearing or multiple ball bearings. The bearing 76, 176, 276 can be any suitable bearing such as, but not limited to, self-aligning bearings, angular-contact bearings, thrust ball bearings, rolling bearings, tapered roller bearings, or the like.

The first bearing assembly 70 can include various internal components such as the inner raceway 72, the outer raceway 74, and the bearing 76. The inner raceway 72, and the outer raceway 74 can be otherwise defined as a first inner raceway 72 and a first outer raceway 74. The second bearing assembly 170 can include various internal components such as a second inner raceway 172, a second outer raceway 174, and the bearing 176. The third bearing assembly 270 can include various internal components such as a third inner raceway 272, a third outer raceway 274, and the bearing 276. The bearings 76, 176, 276 can be nestled between the first, second, and third inner and outer raceways 72, 172, 272, 74, 174, 274, respectively. The first bearing assembly 70 can further include the outer wall 71.

The lubricant supply portion 62, otherwise defined as a first lubrication supply portion 62, a second lubricant supply portion 162, and a third lubricant supply portion 262 can extend from, and through at least a portion of the first, second, and third bearing assemblies 70, 170, 270, respectively. The first lubricant supply portion 62 can include the supply inlet 64 fluidly coupled to the wet chamber 58, the channel portion 66 extending through a portion of the wet chamber 58 and into the first bearing assembly 70, and the supply outlet 68 which can be located within the first bearing assembly 70. The supply inlet 64, the channel portion 66, and the supply outlet 68 can each be otherwise defined as a first supply inlet 64, a channel portion 66, and a first supply outlet 68. Similarly, the second lubricant supply portion 162 can include a second supply inlet 164 fluidly coupled to the wet chamber 58, a second channel 166 portion extending through a portion of the wet chamber 58 and into the second bearing assembly 170, and a second supply outlet 168 which can be located in the second bearing assembly 170. The third lubricant supply portion 262 can include a third supply inlet fluidly 264 coupled to the wet chamber 58, a third channel portion 266 extending through a portion of the wet chamber 58 and into the third bearing assembly 270, and a third supply outlet 268 which can be located in the third bearing assembly 270.

The first, second, and third lubricant supply portions 62, 162, 262 can feed lubricant to the first, second, and third bearing assemblies 70, 170, 270, respectively. Both the first and third supply inlets 64, 264 can be located in a gravitational upper half 56 at respective radial limits 83, 283 of the wet chamber 58. Conversely, the second supply inlet 164 can be located in a gravitational lower half (opposite of a gravitational upper half 56) at a radial limit 183 of the wet chamber 58. The gravitational lower half of the wet chamber 58 can be defined as a portion of the wet chamber 58 which is not opposite the instantaneous gravitational force exerted on the air turbine starter 110 when the air turbine starter 110 is installed on the turbine engine 14.

The first, second, and third supply outlets 68, 168, 268 can be positioned within the first, second, and third bearing assemblies 70, 170, 270, respectively, and be operable to supply the lubricant to the bearings 76, 176, 276. The first and third supply outlets 68, 268 can be positioned within the gravitational upper half 56 of the first and third bearing assemblies 70, 270, while the second supply outlet 168 can be provided in the gravitational lower half of the second bearing assembly 170. The first and second supply outlets 68, 168 can be positioned in an axially forward location of the first and second bearing assemblies 70, 170 of the air turbine starter 110, whereas the third supply outlet 268 can be positioned in an axially downstream or aft location of the third bearing assembly 270.

The first bearing assembly can include the inlet 78 fluidly coupled to the bearing assembly outlet 80. The inlet 78 and the bearing assembly outlet 80 can be otherwise defined as a first inlet 78 and a first bearing assembly outlet 80. The first bearing assembly outlet can be provided in the gravitational lower half (opposite of gravitational upper half 56) of the first bearing assembly 70, such that lubricant which has passed through the first bearing assembly 70 can then flow through the first inlet 78 and out the first bearing assembly outlet 80 and into the upstream chamber 182. Similarly, the second and third bearing assemblies 170, 270 can include a second and third inlet 178, 278 fluidly coupled to a second and third bearing assembly outlet 180, 280. Both the second and third bearing assembly outlets 180, 280 can be fluidly coupled to the downstream chamber 282. However, the second bearing assembly outlet 180 can be located in a gravitational upper half 56 of the downstream chamber 282, while the third bearing assembly outlet can be located in a gravitational lower half of the downstream chamber 282.

An outlet channel can be defined by the portion between the inlet 78 and the bearing assembly outlet 80. The bearing assembly outlet 80 can lead to various internal, or external components of the air turbine starter 10. For example, the lubricant can return to the wet chamber 58 via a bearing assembly outlet 80. Alternatively, the lubricant can be channeled to an exterior waste tub, to the gear assembly 84, back into the bearing assembly 70, or other sections of the air turbine starter 10. The first, second, and third inlets 78, 178, 278 can be placed at an axial, or radial end of the respective first, second, or third bearing assemblies 70, 170, 270 opposite that of the first, second, and third supply outlets 68, 168, 268, respectively. It is contemplated that the first and second inlets 78, 178 can be placed at an upstream end of the first and second bearing assemblies 70, 170, while the third inlet 268 can be placed at a downstream end of the third bearing assembly 270. It is further contemplated that the first and second bearing assembly outlets 80, 180 can be positioned at a downstream end of the first and second bearing assemblies 70, 170, while the third bearing assembly outlet 280 can be placed at an upstream end of the third bearing assembly 270.

In operation, the rotation of the clutch assembly 185 and the gear assembly 84 can exert a centrifugal force on the lubricant within the wet chamber 58. The lubricant can flow from into a first supply inlet 64, the second supply inlet 164, and the third supply inlet 264 of the first, second, and third lubricant supply portions 62, 162, 262 to lubricate the first, second, and third bearing assemblies 70, 170, 270 respectively. It is contemplated that the pressure from of the lubricant created by the rotation of one or more of the rotating assemblies is sufficient enough to enter the first, second, or third bearing assemblies 70, 170, 270, properly lubricate all bearings 76, 176, 276, and exit through the first, second or third bearing assembly outlet 80, 180, 280, respectively.

After the initial startup, the clutch assembly 185 can decouple from the second drive shaft 98. The third drive shaft 199 can continue to rotate after the initial startup of the air turbine starter 110. This can be done via the rotation of the external gearbox downstream the clutch assembly 185 and coupled to the third drive shaft 199. At least a portion of the clutch assembly 185 can continue to rotate via the rotation of the third drive shaft 199 even after the clutch assembly 185 has been decoupled from the second drive shaft 98. As such, the clutch assembly 185 can be defined as a rotating assembly which rotates even after the initial startup of the air turbine starter 110.

It is contemplated that one or more of the first, second, and third supply inlets 64, 164, 264 can be positioned such that the constant rotation of the clutch assembly 185 can continuously lubricate one or more of the first, second, or third bearing assemblies 70, 170, 270 even after the initial startup of the air turbine starter 110 is finished. It will be further appreciated that at least a portion of the first, second, or third lubricant supply portions 62, 162, 262 can be positioned anywhere within the wet chamber 58 or be formed within or as portions of the housing 30, divider structure 90, support structure 181, gear assembly 84, or clutch assembly 185.

As illustrated, the first, second, and third lubricant supply portions 62, 162, 262 can provide lubricant to the first, second or third bearing assemblies 70, 170, 270. The lubricant can be supplied through the lubricant supply portions 62, 162, 262 via the rotation of any one or more rotating assemblies. It will be appreciated, however, that there can be any number of lubricant supply portions or rotating assemblies which can supply lubricant to any number of destinations. For example, the first, second, or third lubricant supply portions 62, 162, 262 can supply lubricant to, a sprag, any shaft bearings (e.g., additional bearings attached to either of the first, second, or third drive shafts 96, 98, 199), sealing systems (e.g., a labyrinth seal between the housing 30 and a portion of a turbine member 50), a hydrodynamic bearing, a cooling radiator, or the like.

Benefits of this disclosure include the simplification of systems to supply lubrication to bearings within an air turbine starter. It will be understood that the present lubrication supply portions do not need additional components to supply a pressurized lubricant to one or more bearing assembly with enough pressure to ensure all bearings within the bearing assembly are properly lubricated and the lubricant is able to flow out of the bearing assembly at a downstream portion.

A further benefit of the lubrication system as described herein includes an increase in lifetime or reliability of the bearing assemblies which in turn reduces the amount of maintenance required. It will be understood that the lubrication system allows for a continuous lubrication of bearing assemblies via the rotation of one or more of the rotating assemblies. This continuous lubrication of the bearing assemblies can ensure the bearings within the bearing assemblies do not wear down due to an absence of lubrication.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An air turbine starter comprising a housing having a divider structure dividing the housing into a wet chamber and an air chamber, with the air chamber having an air supply inlet and an air supply outlet, a bearing assembly, a turbine member located within the air chamber and a first drive shaft coupled to the turbine member and rotatably mounted in the bearing assembly, with the first drive shaft forming a first rotational axis, a rotating assembly located within the wet chamber and an second drive shaft coupled to the rotating assembly, with the second drive shaft forming a second rotational axis, and a lubricant supply portion having at least one supply inlet fluidly coupled to the wet chamber and at least one supply outlet fluidly coupled to the rotating assembly whereby lubricant from the wet chamber can be supplied to the bearing assembly through the lubricant supply portion.

The air turbine starter of any preceding clause, wherein the at least one supply inlet is located in a radial outer half, relative to the second rotational axis, of the wet chamber.

The air turbine starter of any preceding clause, wherein the at least one supply inlet is located at a radial limit of the wet chamber.

The air turbine starter of any preceding clause, wherein the at least one supply inlet is located in a gravitational upper half of the wet chamber.

The air turbine starter of any preceding clause, wherein the lubricant supply portion comprises at least one supply inlet portion defining the at least one supply inlet and a channel portion, and the at least one supply inlet portion has a larger cross-sectional area than the channel portion.

The air turbine starter of any preceding clause, wherein the at least one supply inlet portion has a decreasing cross-sectional area.

The air turbine starter of any preceding clause, wherein the decreasing cross-sectional area is continuously decreasing.

The air turbine starter of any preceding clause, wherein the at least one supply inlet portion defines a cone.

The air turbine starter of any preceding clause, wherein the lubricant supply portion is a stand-alone structure.

The air turbine starter of any preceding clause, wherein the rotating assembly is a gear assembly.

The air turbine starter of any preceding clause, wherein the bearing assembly is carried by a divider structure.

The air turbine starter of any preceding clause, wherein at least a portion of the lubricant supply portion is formed by the divider structure The air turbine starter of any preceding clause, further comprising a lubricant outlet channel having an inlet fluidly coupled to the bearing assembly and a bearing assembly outlet fluidly coupled to the wet chamber.

The air turbine starter of any preceding clause, wherein the at least one supply inlet and the inlet fluidly coupled to different portions of the bearing assembly.

The air turbine starter of any preceding clause, wherein one of the at least one supply inlet or the inlet is fluidly coupled to an upstream portion of the bearing assembly and the other of the at least one supply inlet or inlet is fluidly coupled to a downstream portion of the bearing assembly.

The air turbine starter of any preceding clause, wherein the bearing assembly outlet is located in a gravitational lower half of the wet chamber.

A method of lubricating a bearing in an air turbine starter having a housing defining an air chamber and a wet chamber, with a turbine member located in the air chamber, a bearing assembly located within the wet chamber, and a rotating assembly located in the wet chamber, which contains a lubricant, the method comprising rotating the rotating assembly to apply a force to the at least some of the lubricant and using the applied force to supply the lubricant to the bearing assembly.

The method of any preceding clause, wherein the applying the force comprises applying a centrifugal force to some of the lubricant.

The method of any preceding clause, wherein the lubricant supplied to the bearing is returned to the wet chamber.

The method of any preceding clause, wherein the return of the lubricant is at least partially affected by gravitational force.

The method of any preceding clause, wherein the lubricant supplied to the bearing is channeled to an exterior of the air turbine starter.

The method of any preceding clause, wherein the rotation of the rotating assembly comprises the rotation of a gear assembly.

An air turbine starter comprising a housing having a divider structure dividing the housing into a wet chamber and an air chamber, with the air chamber having an air supply inlet and an air supply outlet, a bearing assembly carried by the divider structure, a turbine member located within the air chamber and a turbine first shaft coupled to the turbine member and rotatably mounted in the bearing assembly, with the first drive shaft forming a first rotational axis, a gear assembly having a gear assembly located within the wet chamber and a second drive shaft coupled to the gear assembly and extending from the housing, with the second drive shaft forming a second rotational axis, and a lubricant supply portion fluidly having a supply inlet fluidly coupled to the wet chamber and a supply outlet fluidly coupled to the bearing assembly whereby lubricant from the wet chamber can be supplied to the bearing assembly through the lubricant supply portion.

The air turbine starter of any preceding clause, wherein the supply inlet is located in a radial outer half, relative to the second rotational axis, of the wet chamber.

The air turbine starter of any preceding clause, wherein the supply inlet is located at a radial limit of the wet chamber.

The air turbine starter of any preceding clause, wherein the supply inlet is located in a gravitational upper half of the wet chamber.

The air turbine starter of any preceding clause, wherein the lubricant supply portion comprises a supply inlet portion defining the supply inlet and a channel portion, and the supply inlet portion has a larger cross-sectional area than the channel portion.

The air turbine starter of any preceding clause, wherein the supply inlet portion has a decreasing cross-sectional area.

The air turbine starter of any preceding clause, wherein the decreasing cross-sectional area is continuously decreasing.

The air turbine starter of any preceding clause, wherein the supply inlet portion defines a cone.

The air turbine starter of any preceding clause, wherein the lubricant supply portion is a stand-alone structure.

The air turbine starter of any preceding clause, wherein at least a portion of the lubricant supply portion is formed by the divider structure The air turbine starter of any preceding clause, further comprising a lubricant outlet channel having a inlet fluidly coupled to the bearing assembly and a bearing assembly outlet fluidly coupled to the wet chamber.

The air turbine starter of any preceding clause, wherein the supply inlet and inlet are fluidly coupled to different portions of the bearing assembly.

The air turbine starter of any preceding clause, wherein one of the supply or inlets is fluidly coupled to an upstream portion of the bearing assembly and the other of the supply or inlets is fluidly coupled to a downstream portion of the bearing assembly.

The air turbine starter of any preceding clause, wherein the supply outlet is located in a gravitational lower half of the wet chamber.

A method of lubricating a bearing in an air turbine starter having a housing defining an air chamber and a wet chamber, with a turbine member located in the air chamber and having a first drive shaft rotationally supported by the bearing, and a gear assembly located in the wet chamber, which contains a lubricant, the method comprising rotating the gear assembly to apply a force to the at least some of the lubricant and using the applied force to supply the lubricant to the bearing.

The method of any preceding clause, wherein the applying the force comprises applying a centrifugal force to some of the lubricant.

The method of any preceding clause, wherein the lubricant supplied to the bearing is returned to the wet chamber.

The method of any preceding clause, wherein the return of the lubricant is at least partially affected by gravitational force.

The method of any preceding clause, wherein the lubricant supplied to the bearing is channeled to an exterior of the air turbine starter.

The method of any preceding clause, wherein the rotation of the gear assembly comprises the rotation of a gear assembly.

What is claimed is:

1. A method of lubricating a bearing in an air turbine starter having a housing defining an air chamber and a wet chamber, with a turbine member located in the air chamber, a bearing assembly located within the wet chamber and including the bearing, and a rotating assembly located in the wet chamber, the rotating assembly rotating about a rotational axis and including at least one of a gear assembly or a clutch assembly, the wet chamber contains a lubricant, the method comprising:
   rotating the rotating assembly in a direction of rotation about the rotational axis;
   applying, through the rotating of the rotating assembly, a circumferential force on at least a portion of the lubricant within the wet chamber such that the at least the portion of the lubricant follows the rotation of the rotating assembly and flows circumferentially within the wet chamber, with respect to the rotational axis;
   positioning a lubricant supply inlet of a lubricant supply portion within a portion of the wet chamber that is located radially outward from a radially outer limit of the rotating assembly, with respect to the rotational axis;

positioning the lubricant supply inlet such that the lubricant supply inlet faces a circumferential direction, with respect to the rotational axis, that opposes at least the portion of the lubricant flowing circumferentially within the wet chamber; and receiving at a lubricant supply outlet of the lubricant supply portion directly fluidly coupled to the bearing assembly a portion of the lubricant supplied to the lubricant supply inlet.

2. The method of claim 1 wherein the lubricant supplied to the bearing assembly is channeled to an exterior of the air turbine starter.

3. The method of claim 1, wherein the rotating assembly includes the gear assembly having a plurality of gears and the method further comprises providing the lubricant supply inlet radially outward of each gear of the plurality of gears.

4. An air turbine starter comprising:
a housing having a wall dividing the housing into a wet chamber and an air chamber, with the air chamber having an air supply inlet and an air supply outlet;
a bearing assembly having a bearing housing defining an interior, and a set of bearings provided within the interior, with at least a portion of the bearing housing being provided within the air chamber;
a turbine member located within the air chamber, the turbine member being rotational coupled to a first drive shaft rotatably mounted in the bearing assembly, with the first drive shaft forming a first rotational axis;
a rotating assembly located within the wet chamber, the rotating assembly being rotationally coupled to a second drive shaft, with the second drive shaft forming a second rotational axis, the rotating assembly including at least one of a gear assembly or a clutch assembly; and
a lubricant supply portion having:
a lubricant supply inlet fluidly coupled to the wet chamber; and
a lubricant supply outlet fluidly coupled to the bearing assembly and being provided axially closer to an axially forwardmost portion of the bearing housing, with respect to the first rotational axis, than each bearing of the set of bearings provided within the interior;
wherein lubricant from the wet chamber is supplied to the bearing assembly through the lubricant supply portion.

5. An air turbine starter comprising:
a housing having a wall dividing the housing into a wet chamber and an air chamber, with the air chamber having an air supply inlet and an air supply outlet;
a bearing assembly having a set of bearings;
a turbine member located within the air chamber, the turbine member being rotational coupled to a first drive shaft rotatably mounted in the bearing assembly, with the first drive shaft forming a first rotational axis;
a rotating assembly located within the wet chamber, the rotating assembly being rotationally coupled to a second drive shaft, with the second drive shaft forming a second rotational axis, the rotating assembly including at least one of a gear assembly or a clutch assembly; and
a lubricant supply portion having:
a lubricant supply inlet fluidly coupled to and provided within the wet chamber, the lubricant supply inlet facing a circumferential direction with respect to the second rotational axis; and
a lubricant supply outlet fluidly coupled to the bearing assembly;
wherein lubricant from the wet chamber is supplied to the bearing assembly through the lubricant supply portion.

6. The air turbine starter of claim 5, wherein the lubricant supply inlet is located at a radial limit of the wet chamber.

7. The air turbine starter of claim 5, wherein the lubricant supply inlet is located in a gravitational upper half of the wet chamber.

8. The air turbine starter of claim 5, wherein the lubricant supply portion comprises a lubricant supply inlet portion defining the lubricant supply inlet and a channel portion, and the lubricant supply inlet portion has a larger cross-sectional area than the channel portion.

9. The air turbine starter of claim 8 wherein the lubricant supply inlet portion has a decreasing cross-sectional area.

10. The air turbine starter of claim 9 wherein the lubricant supply inlet portion defines a cone.

11. The air turbine starter of claim 5, wherein the rotating assembly includes the gear assembly having a plurality of gears.

12. The air turbine starter of claim 5, wherein at least a portion of the lubricant supply portion is formed by the wall.

13. The air turbine starter of claim 5, further comprising a lubricant outlet channel having a second inlet fluidly coupled to the bearing assembly and a bearing assembly outlet fluidly coupled to the wet chamber.

14. The air turbine starter of claim 13 wherein the bearing assembly outlet is located in a gravitational lower half of the wet chamber.

15. The air turbine starter of claim 13 wherein one of the lubricant supply inlet or the second inlet is fluidly coupled to an upstream portion of the bearing assembly and an other of the lubricant supply inlet or the second inlet is fluidly coupled to a downstream portion of the bearing assembly.

16. The air turbine starter of claim 5, further comprising:
an upstream chamber provided within the wet chamber upstream of the gear assembly; and
a downstream chamber provided within the wet chamber downstream of the gear assembly;
wherein the lubricant supply inlet is provided within one of either the upstream chamber or the downstream chamber.

17. The air turbine starter of claim 16, wherein the lubricant supply portion is a first lubricant supply portion with and the lubricant supply inlet is provided within the upstream chamber, and the air turbine starter further comprises a second lubricant supply portion having a respective lubricant supply inlet provided within the downstream chamber.

18. The air turbine starter of claim 17, wherein the bearing assembly is a first bearing assembly fluidly coupled to the first lubricant supply portion, the air turbine starter further comprising:
a second bearing assembly provided within the downstream chamber and being fluidly coupled to the second lubricant supply portion.

19. The air turbine starter of claim 18, further comprising:
a third bearing assembly provided within the downstream chamber, downstream of the second bearing assembly; and a third lubricant supply portion having a respective lubricant supply inlet provided within the downstream chamber and being fluidly coupled to the third bearing assembly.

\* \* \* \* \*